(12) United States Patent
Hutchinson et al.

(10) Patent No.: US 9,155,396 B2
(45) Date of Patent: Oct. 13, 2015

(54) CUP HOLDER ASSEMBLY AND SEAT THEREWITH

(71) Applicants: James M.F. Hutchinson, Mohnton, PA (US); Kyle Mason, Reading, PA (US)

(72) Inventors: James M.F. Hutchinson, Mohnton, PA (US); Kyle Mason, Reading, PA (US)

(73) Assignee: BP Children's Products HK Co., Limited, Kwai Chung, N.T. (HK)

( * ) Notice: Subject to any disclaimer, the term of this patent is extended or adjusted under 35 U.S.C. 154(b) by 141 days.

(21) Appl. No.: 13/929,733

(22) Filed: Jun. 27, 2013

(65) Prior Publication Data
US 2014/0001797 A1    Jan. 2, 2014

(30) Foreign Application Priority Data

Jul. 2, 2012    (CN) ...................... 2012 2 0316769 U

(51) Int. Cl.
*A47C 7/62*    (2006.01)
*B60N 3/10*    (2006.01)
*B60N 2/28*    (2006.01)

(52) U.S. Cl.
CPC . *A47C 7/62* (2013.01); *B60N 2/286* (2013.01); *B60N 3/103* (2013.01)

(58) Field of Classification Search
CPC ........................................................ A47C 7/62
USPC ............... 297/188.14, 188.18, 188.2, 188.21; 248/311.2, 346.11
See application file for complete search history.

(56) References Cited

U.S. PATENT DOCUMENTS

| | | | | | |
|---|---|---|---|---|---|
| 4,174,866 | A | * | 11/1979 | Rhyan | 297/188.18 |
| 4,865,237 | A | * | 9/1989 | Allen | 224/42.45 |
| 4,928,876 | A | * | 5/1990 | Marshall | 229/103.1 |
| 6,467,839 | B1 | * | 10/2002 | Kain | 297/188.14 |
| 6,997,509 | B2 | * | 2/2006 | Kain | 297/250.1 |
| 7,195,314 | B2 | * | 3/2007 | Spence et al. | 297/250.1 |
| 2012/0043789 | A1 | * | 2/2012 | Lee | 297/188.06 |
| 2012/0175922 | A1 | * | 7/2012 | Gillett et al. | 297/188.01 |
| 2012/0299340 | A1 | * | 11/2012 | Krasley | 297/188.14 |

FOREIGN PATENT DOCUMENTS

| | | |
|---|---|---|
| CN | 202686063 U | 1/2013 |
| EP | 1 810 872 A1 | 7/2007 |
| JP | 10291442 A | 11/1998 |

\* cited by examiner

*Primary Examiner* — David R Dunn
*Assistant Examiner* — Jody Giacoman
(74) *Attorney, Agent, or Firm* — Winston Hsu; Scott Margo

(57) ABSTRACT

The present invention provides a cup holder assembly adapted for a seat and the seat with the cup holder assembly. The cup holder assembly includes a lateral cover installed on a lateral side of the seat, a main body, and a connection portion connected to a lateral side of the main body. The connection portion hangs on the lateral cover so as to hang the main body on the lateral cover, and a cup can be disposed inside the main body of the cup holder assembly. It not only has simple structure and convenient operation but also can prevent from overturning the cup.

16 Claims, 6 Drawing Sheets

CUP HOLDER ASSEMBLY AND SEAT THEREWITH

BACKGROUND OF THE INVENTION

1. Field of the Invention

The present invention relates to a cup holder assembly and a seat therewith, and more specifically, to a cup holder assembly and a seat therewith with simple structure and convenient operation and capable of adjusting an inclined angle of a cup.

2. Description of the Prior Art

A cup is essential to people's daily life for drinking water. It is usually placed on the desktop for accessibility, but it is easy to overturn the cup carelessly, so that a cup holder is designed for solving the problem. The cup holder can contain a cup, a water bottle, a drink can, and so on, so that people don't worry about spilling water and don't have to hold the cup on hands laboriously. A conventional cup holder is often connected to a seat in a clamping or other manner and disposed on an armrest of the seat. If the armrest is not linked to a backrest of the seat, a position of the cup holder cannot be adjusted as adjusting an inclined angle of the backrest, so that the cup disposed inside the cup holder will not incline. However, some seats are designed to set the armrest and the backrest to be linked or integrated, such as a child safety seat. As for this structural design, the cup disposed inside the cup holder will incline accordingly as adjusting the inclined angle of the backrest, resulting in limited placement function of the cup holder, and the water may even spill from the cup due to the inclined cup holder.

SUMMARY OF THE INVENTION

A purpose of the present invention is to provide a cup holder assembly and a seat therewith with simple structure and convenient operation and capable of adjusting an inclined angle of a cup, to solve the problems mentioned above.

In order to achieve above purposes, the present invention is to provide a cup holder assembly including a lateral cover installed on a lateral side of the seat, a main body, and a connection portion connected to a lateral side of the main body. The connection portion hangs on the lateral cover so as to hang the main body on the lateral cover. It not only has simple structure and convenient operation but also can prevent from overturning the cup.

Preferably, a plurality of sunken portions is formed on the lateral cover, and a positioning rib is formed on the connection portion for selectively engaging inside one of the plurality of sunken portions.

Preferably, engaging positions of the positioning rib and the plurality of sunken portions are in a radial arrangement relative to a joint of the connection portion and the main body.

Preferably, the connection portion is bent from the main body.

Preferably, the main body and the connection portion are integrally formed.

Preferably, at least one resilient part is formed on the connection portion, and at least one blocking rib is formed on the lateral cover for blocking the at least one resilient part.

Preferably, two resilient parts are respectively formed on two lateral sides of the connection portion symmetrically.

Preferably, each resilient portion is an arc-shaped structure.

Preferably, a slot is formed on an outer edge of the lateral cover to hold the connection portion.

Preferably, a width of the slot is greater than a width of a part of the connection portion disposed inside the slot.

Preferably, a middle bottom of the slot is protruded or the slot is formed in an arc shape.

Preferably, an abutting rib is protruded from an outer side of the main body to abut against the lateral cover.

Preferably, the main body comprises an outer holder and an inner holder disposed inside the outer holder.

Preferably, a connecting hole is formed on a bottom of the outer holder, and a connecting component is formed on the inner holder to engage with the connecting hole of the outer holder, so as to fix the inner holder with the outer holder.

Preferably, the connecting component is protruded from an outer bottom of the inner holder for inserting into the connecting hole of the outer holder, so as to fix the inner holder with the outer holder.

In order to achieve above purposes, the present invention is further to provide a seat including a seat body with an adjustable angle, and a cup holder assembly connected to the seat body. The cup holder assembly includes a lateral cover installed on a lateral side of the seat body, a main body, and a connection portion connected to a lateral side of the main body. The connection portion is for hanging on the lateral cover so as to hang the main body on the seat body.

The cup holder assembly and the seat therewith of the present invention hang the main body on the lateral cover on the seat body. A relative angle between the main body and the lateral cover can be adjusted by selectively engaging the positioning rib into one of the plurality of sunken portions, so as to keep the cup disposed inside the main body in a level position even though the seat body is adjusted to be in an inclined situation. It can prevent the water from spilling from the cup as the seat body is inclined. In conclusion, the present invention provides the cup holder assembly with simple structure and convenient operation and capable of adjusting an inclined angle of the cup.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
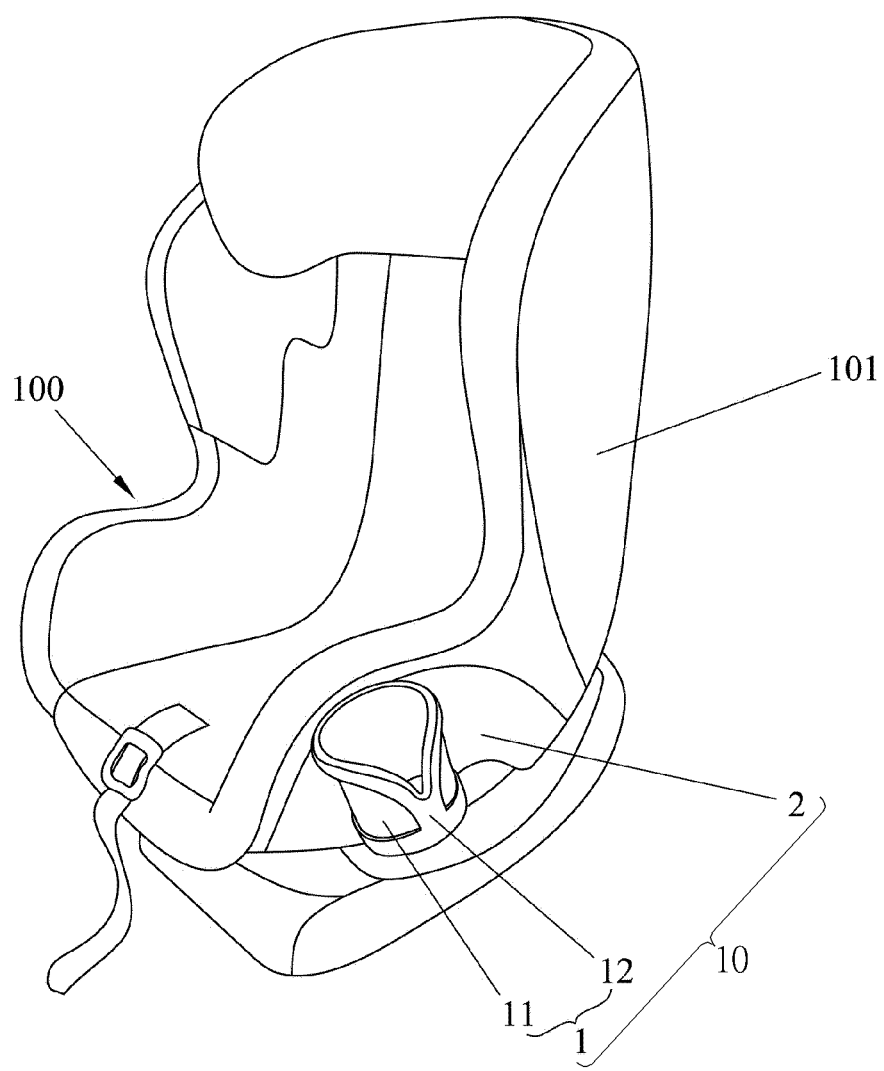
FIG. 1 is a schematic drawing of a seat according to an embodiment of the present invention.

Please refer to FIG. 1. FIG. 1 is a schematic drawing of a seat 100 according to an embodiment of the present invention. The seat 100 can be a child safety seat. The seat 100 includes a seat body 101 capable of being adjusted to be in different angles, and a cup holder assembly 10 connected to the seat body 101 for holding a cup. The cup holder assembly 10 includes a lateral cover 2 installed on a lateral side of the seat body 101, and a main body 1 for containing the cup, so as to prevent water from spilling from the cup. The main body 1 includes an outer holder 12 and an inner holder 11 disposed inside the outer holder 12.

Figure 2:
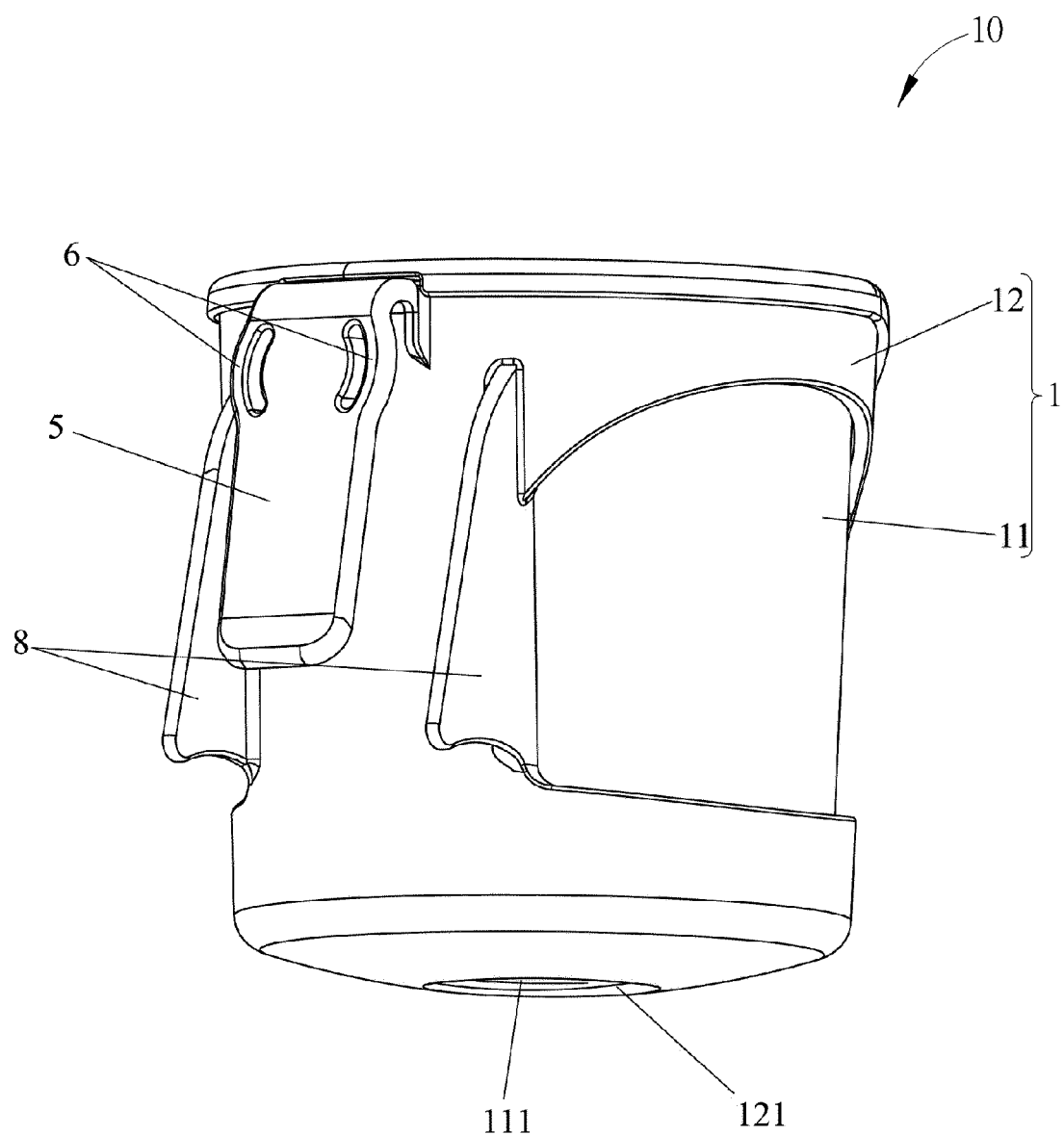
FIG. 2 is a diagram of a cup holder assembly according to the embodiment of the present invention.

Please refer to FIG. 1 and FIG. 2. FIG. 2 is a diagram of the cup holder assembly 10 according to the embodiment of the present invention. A connecting hole 121 is formed on a bottom of the outer holder 12, and a connecting component 111 is formed on the inner holder 11 to engage with the connecting hole 121 of the outer holder 12, so as to fix the inner holder 11 with the outer holder 12. Preferably, the connecting component 111 can be protruded from an outer bottom of the inner holder 11 for inserting into the connecting hole 121 of the outer holder 12, so as to stably fix the inner holder 11 with the outer holder 12. The cup holder assembly 10 further includes a connection portion 5 connected to a lateral side of the main body 1 and for hanging on the lateral cover 2, so as to hang the main body 1 on the seat body 101. The connection portion 5 can be bent from the main body 1. Additionally, the main body 1 and the connection portion 5 can be integrally formed. As the seat body 101 is adjusted to be in different angles, the main body 1 disposed on the lateral cover 2 via the connection portion 5 is moved accordingly.

Figure 3:
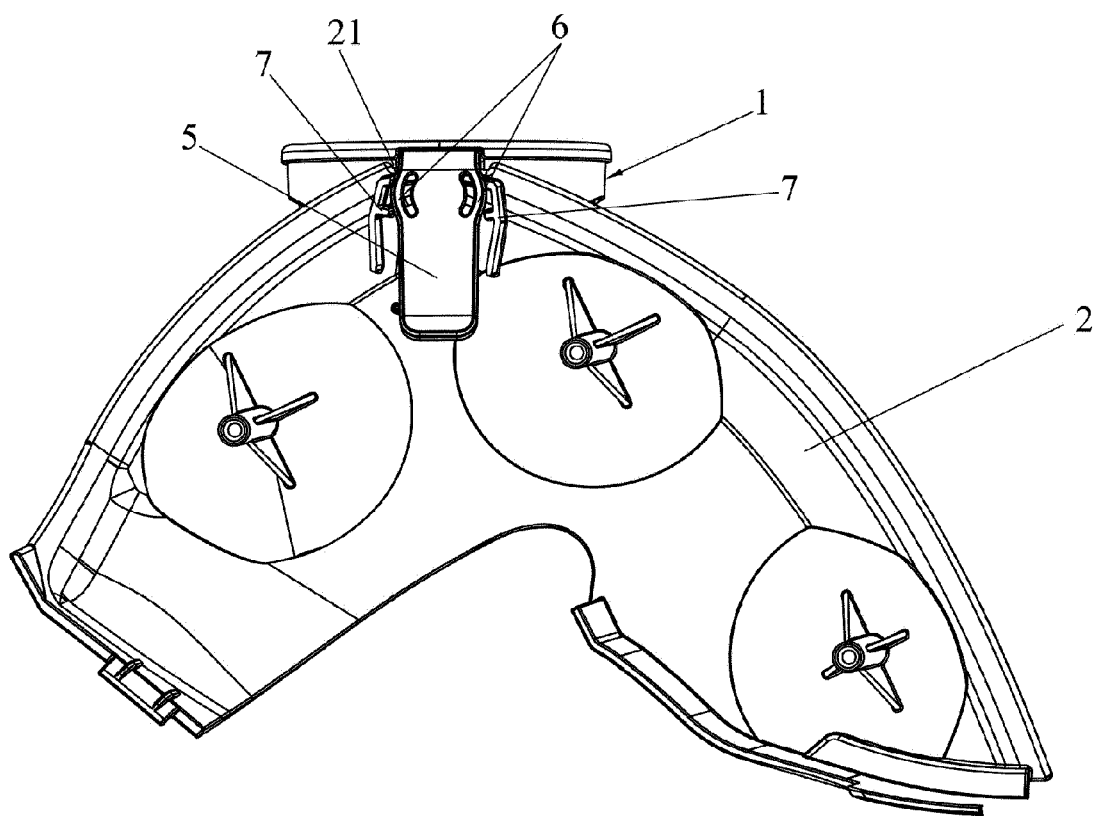
FIG. 3 is a diagram of a connection portion hanging on a lateral cover according to the embodiment of the present invention.
Figure 4:
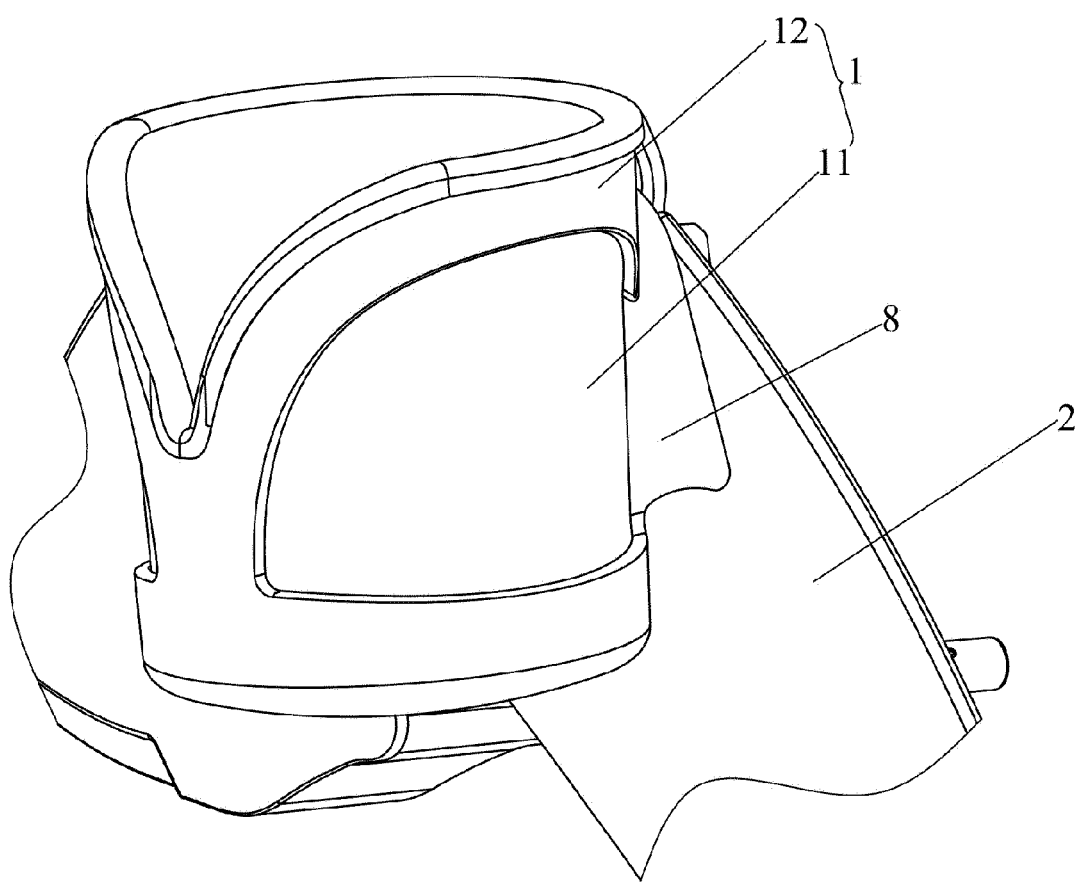
FIG. 4 is another view of the connection portion hanging on the lateral cover according to the embodiment of the present invention.
Figure 5:
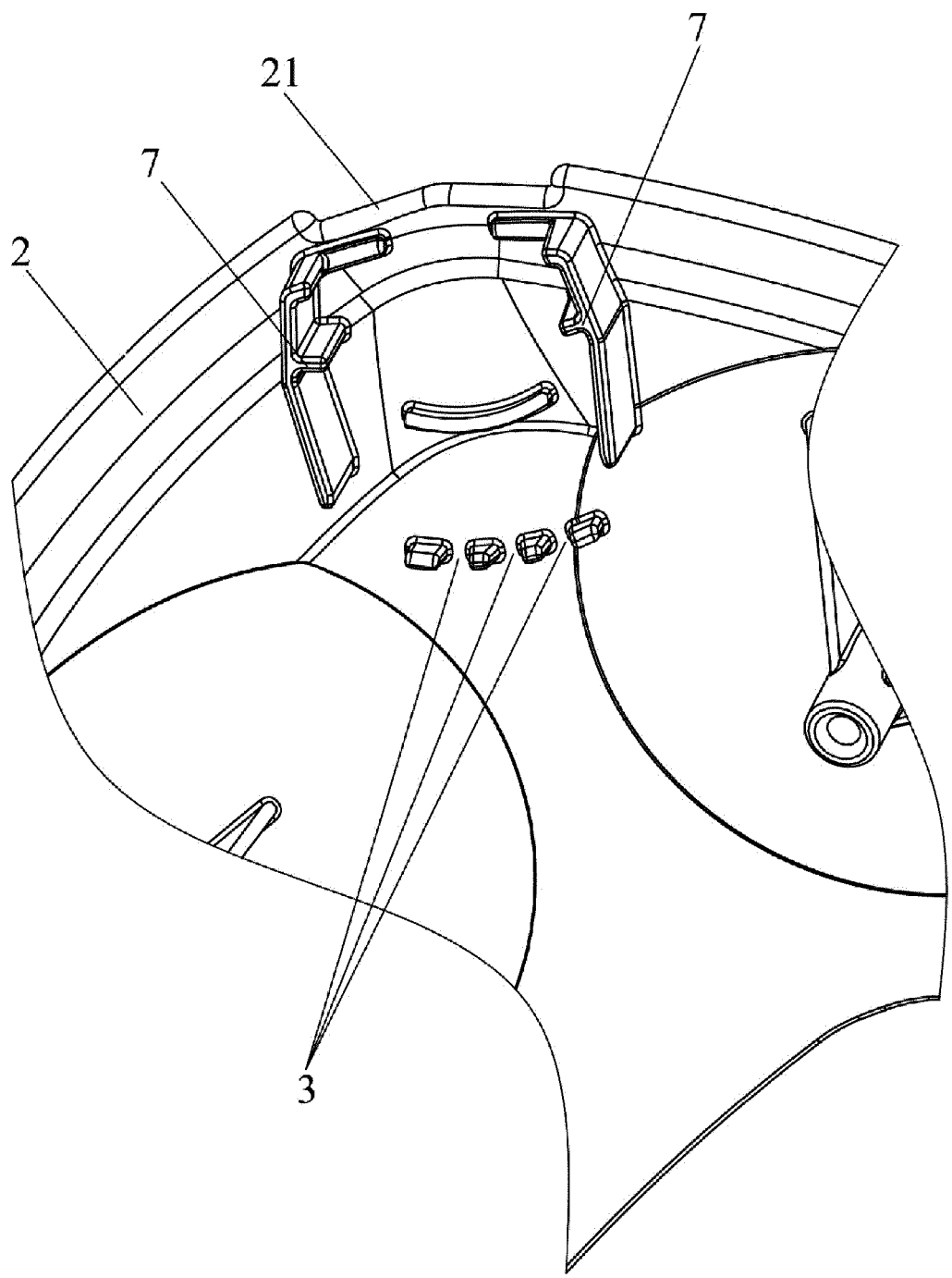
FIG. 5 is a diagram of the lateral cover according to the embodiment of the present invention.
Figure 6:
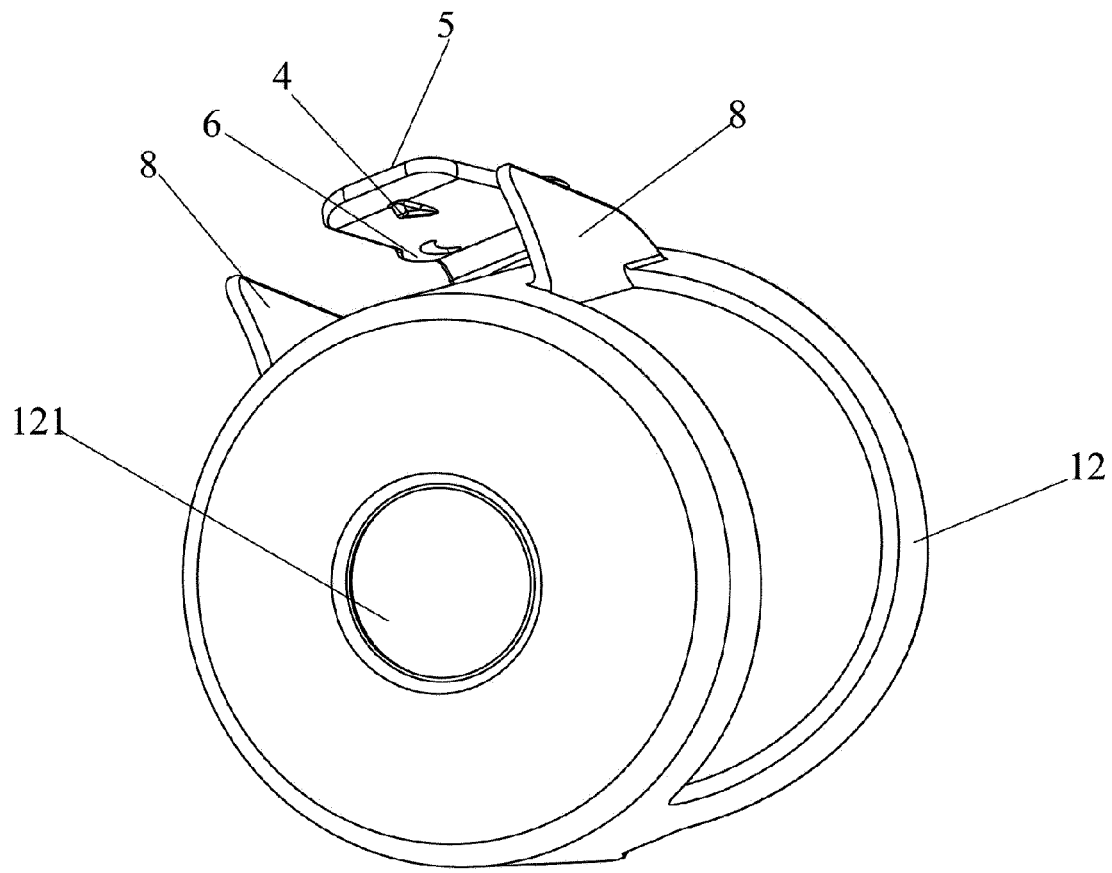
FIG. 6 is a diagram of an outer holder according to the embodiment of the present invention.

Please refer to FIG. 1 to FIG. 6. FIG. 3 is a diagram of the connection portion 5 hanging on the lateral cover 2 according to the embodiment of the present invention. FIG. 4 is another view of the connection portion 5 hanging on the lateral cover 2 according to the embodiment of the present invention. FIG. 5 is a diagram of the lateral cover 2 according to the embodiment of the present invention. FIG. 6 is a diagram of the outer holder 12 according to the embodiment of the present invention. As shown in FIG. 5 and FIG. 6, a plurality of sunken portions 3 is formed on the later cover 2, and a positioning rib 4 is formed on the connection portion 5 for selectively engaging inside one of the plurality of sunken portions 3, so as to adjust a position of the main body 1 relative to the lateral cover 2. For example, a relative angle between the main body 1 and the lateral cover 2 can be adjusted by selectively engaging the positioning rib 4 into one of the plurality of sunken portions 3, so as to keep the cup disposed inside the main body 1 in a level position even though the seat body 101 is adjusted to be in an inclined situation. It can prevent the water from spilling from the cup as the seat body 101 is inclined. It not only has simple structure and convenient operation but also can prevent from overturning the cup. The plurality of sunken portions 3 can be formed between several protrusions. Preferably, the plurality of sunken portions 3 can be formed in a radial arrangement, so that engaging positions of the positioning rib 4 and the plurality of sunken portions 3 are in a radial arrangement relative to a joint of the connection portion 5 and the main body 1.

Besides, at least one resilient part 6 is formed on the connection portion 5, and at least one blocking rib 7 is accordingly formed on the lateral cover 2 for blocking the at least one resilient part 6. Each resilient portion 6 can be an arc-shaped structure. In this embodiment, there are two resilient parts 6 respectively formed on two lateral sides of the connection portion 5 symmetrically, and there are two blocking ribs 7 formed on the lateral cover 2 accordingly. As the connection portion 5 hangs on the lateral cover 2, each resilient part 6 pushes against the corresponding blocking rib 7 resiliently, so as to hang the main body 1 on the lateral cover 2 stably.

Furthermore, a slot 21 is formed on an outer edge of the lateral cover 2 to hold the connection portion 5. That is, the connection portion 5 can be constrained inside the slot 21, so as to fix the connection portion 5 on the lateral cover 2 stably. Preferably, a width of the slot 21 can be greater than a width of a part of the connection portion 5 disposed inside the slot 21, so as to provide moving space for the connection portion 5 along the slot 21 as the main body 1 is hung on the lateral cover 2 in different angles. A middle bottom of the slot 21 can be protruded, or the slot 21 can be formed in an arc shape, so that the connection portion 5 can be engaged inside the slot 21 stably. Additionally, at least one abutting rib 8 is protruded from an outer side of the main body 1 to abut against the lateral cover 2 for preventing the main body 1 from shaking. In this embodiment, there are two abutting ribs 8 protruded from the outer side of the main body 1. As each abutting rib 8 abuts against the lateral cover 2, the main body 1 will not shake easily even though the seat 100 in a moving vehicle is vibrated.

In contrast with the prior art, the cup holder assembly and the seat therewith of the present invention hang the main body on the lateral cover on the seat body. A relative angle between the main body and the lateral cover can be adjusted by selectively engaging the positioning rib into one of the plurality of sunken portions, so as to keep the cup disposed inside the main body in a level position even though the seat body is adjusted to be in an inclined situation. It can prevent the water from spilling from the cup as the seat body is inclined. In conclusion, the present invention provides the cup holder assembly with simple structure and convenient operation and capable of adjusting an inclined angle of the cup.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cup holder assembly adapted for a seat, the cup holder assembly comprising:
   a lateral cover installed on a lateral side of the seat, a plurality of sunken portions being formed on the lateral cover;
   a main body; and
   a connection portion connected to a lateral side of the main body, the connection portion being for hanging on the lateral cover so as to hang the main body on the lateral cover, a positioning rib being formed on the connection portion for selectively engaging inside one of the plurality of sunken portions, and engaging positions of the positioning rib and the plurality of sunken portions being in a radial arrangement relative to a joint of the connection portion and the main body so that distances between the engaging positions of the positioning rib and the plurality of sunken portions and the joint of the connection portion and the main body are substantially identical, wherein the connection portion and the main body are disposed on opposite sides of the lateral cover when the connection portion hangs on the later cover.

2. The cup holder assembly of claim 1, wherein the connection portion is bent from the main body.

3. The cup holder assembly of claim 2, wherein the main body and the connection portion are integrally formed.

4. The cup holder assembly of claim 2, wherein at least one resilient part is formed on the connection portion, and at least one blocking rib is formed on the lateral cover for contacting against the at least one resilient part when the connection portion hangs on the later cover.

5. The cup holder assembly of claim 4, wherein two resilient parts are respectively formed on two lateral sides of the connection portion symmetrically.

6. The cup holder assembly of claim 5, wherein each resilient portion is an arc-shaped structure.

7. The cup holder assembly of claim 1, wherein a slot is formed on an outer edge of the lateral cover to hold the connection portion.

8. The cup holder assembly of claim 7, wherein a width of the slot is greater than a width of a part of the connection portion disposed inside the slot.

9. The cup holder assembly of claim 7, wherein a middle bottom of the slot is a protruded structure or the slot is formed in an arc shape.

10. The cup holder assembly of claim 1, wherein an abutting rib is protruded from an outer side of the main body to abut against the lateral cover.

11. The cup holder assembly of claim 1, wherein the main body comprises an outer holder and an inner holder disposed inside the outer holder.

12. The cup holder assembly of claim 11, wherein a connecting hole is formed on a bottom of the outer holder, and a connecting component is formed on the inner holder to engage with the connecting hole of the outer holder, so as to fix the inner holder with the outer holder.

13. The cup holder assembly of claim 12, wherein the connecting component is protruded from an outer bottom of the inner holder for inserting into the connecting hole of the outer holder, so as to fix the inner holder with the outer holder.

14. A seat comprising:
a seat body with an adjustable angle; and
a cup holder assembly connected to the seat body, the cup holder assembly comprising:
　a lateral cover installed on a lateral side of the seat body, a plurality of sunken portions being formed on the lateral cover;
　a main body; and
　a connection portion connected to a lateral side of the main body, the connection portion being for hanging on the lateral cover so as to hang the main body on the seat body, a positioning rib being formed on the connection portion for selectively engaging inside one of the plurality of sunken portions so as to adjust a position of the main body relative to the lateral cover, and engaging positions of the positioning rib and the plurality of sunken portions being in a radial arrangement relative to a joint of the connection portion and the main body so that distances between the engaging positions of the positioning rib and the plurality of sunken portions and the joint of the connection portion and the main body are substantially identical, wherein the connection portion and the main body are disposed on opposite sides of the lateral cover when the connection portion hangs on the later cover.

15. The seat of claim 14, wherein at least one resilient part is formed on the connection portion, and at least one blocking rib is formed on the lateral cover for contacting against the at least one resilient part when the connection portion hangs on the later cover.

16. The seat of claim 14, wherein an abutting rib is protruded from an outer side of the main body to abut against the lateral cover for preventing the main body from shaking.

\* \* \* \* \*